(12) United States Patent
Stetzer et al.

(10) Patent No.: US 11,085,545 B2
(45) Date of Patent: Aug. 10, 2021

(54) PILOT-ACTUATED SPOOL VALVE HAVING ROD RETAINER

(71) Applicant: National Coupling Company, Inc., Stafford, TX (US)

(72) Inventors: Max Stetzer, Houston, TX (US); Robert E. Smith, III, Missouri City, TX (US); Frank Harold Hollister, Sugar Land, TX (US); Chris Roy, Stafford, TX (US); Stephen L. Wells, Houston, TX (US)

(73) Assignee: National Coupling Company, Inc., Stafford, TX (US)

( * ) Notice: Subject to any disclaimer, the term of this patent is extended or adjusted under 35 U.S.C. 154(b) by 56 days.

(21) Appl. No.: 16/561,736

(22) Filed: Sep. 5, 2019

(65) Prior Publication Data

US 2020/0096114 A1    Mar. 26, 2020

Related U.S. Application Data

(60) Provisional application No. 62/736,750, filed on Sep. 26, 2018.

(51) Int. Cl.
*F16K 1/42*      (2006.01)
*F16K 11/07*     (2006.01)
(Continued)

(52) U.S. Cl.
CPC .......... *F16K 1/422* (2013.01); *F16K 11/0712* (2013.01); *F16K 13/02* (2013.01); *F16K 31/1221* (2013.01); *Y10T 137/7501* (2015.04)

(58) Field of Classification Search
CPC .. F16K 11/0712; F16K 1/422; F16K 31/1221; Y10T 137/7501
See application file for complete search history.

(56) References Cited

U.S. PATENT DOCUMENTS 3,315,702 A  *  4/1967  Passaggio ............... F15B 13/04
                                                137/625.64
4,162,763 A  *  7/1979  Higgins .................... B05B 1/10
                                                    239/583

(Continued)

OTHER PUBLICATIONS

Examination Report dated Jul. 8, 2020 in counterpart application No. GB1913852.8, 10-pgs.

*Primary Examiner* — Kevin R Barss
(74) *Attorney, Agent, or Firm* — Blank Rome LLP (57) ABSTRACT

A pilot-actuated spool valve comprises a generally cylindrical valve cage having a central axial cavity open at both ends and a plurality of generally radial openings connecting the central axial cavity to the external cylindrical surface of the cage; a valve sleeve sized to slide within the central axial cavity of the cage and having a first sealing surface at a first end and a second sealing surface at an opposing second end; a piston responsive to fluid pressure at a pilot inlet of the valve; a piston rod connected at a first end to the piston and having a threaded second end opposite the first end; and a cap nut in threaded engagement with the second end of the piston rod securing the valve sleeve to the piston rod. The cap nut is sized and configured to provide a clearance gap between the cap nut and the valve sleeve when the cap nut is fully tightened onto the threaded second end of the piston rod.

22 Claims, 5 Drawing Sheets

(51) Int. Cl.
*F16K 13/02* (2006.01)
*F16K 31/122* (2006.01)

(56) References Cited

U.S. PATENT DOCUMENTS

| | | | |
|---|---|---|---|
| 4,457,489 A | 7/1984 | Gilmore | |
| 4,887,643 A | 12/1989 | Tomlin et al. | |
| 5,771,931 A | 6/1998 | Watson | |
| 6,497,251 B1 | 12/2002 | Watson | |
| 8,387,659 B2 | 3/2013 | Hunnicutt | |
| 2012/0193565 A1* | 8/2012 | Rowe | F16K 11/0712 251/359 |
| 2013/0319557 A1 | 12/2013 | Smith et al. | |
| 2016/0332639 A1* | 11/2016 | Bartling | B05C 19/06 |

* cited by examiner

PILOT-ACTUATED SPOOL VALVE HAVING ROD RETAINER

CROSS-REFERENCE TO RELATED APPLICATIONS

This application claims the benefit of U.S. Provisional Appl. No. 62/736,750, filed 26 Sep. 2018, which is incorporated herein by reference in its entirety.

BACKGROUND

1. Field of the Disclosure

This present disclosure relates to a valve and relates, more particularly, to a subplate-mounted, pilot-actuated spool valve.

2. Description of the Related Art

Remote controlled valves are used in subsea application for a number of operations. For example, U.S. Pat. No. 4,457,489 to Gilmore describes subsea fluid conduit connections for remote controlled valves.

A reciprocating sleeve (or "spool") type valve is one type of valve that can be used subsea for controlling fluid communication of an outlet port with either a supply or vent port depending on the position of the reciprocating spool. In spool valves of the prior art, it has been found that the means used to secure a piston to the reciprocating spool tends to loosen when the valve is subjected to repeated use.

For example, U.S. Pat. No. 5,771,931 to Watson discloses a reciprocating spool type valve that uses a castle nut and a cotter pin on a distal end of a piston's stem to engage against a hub of a reciprocating spool to hold the spool on the piston's stem.

In another example, U.S. Pat. No. 4,887,643 to Tomlin et al. describes a pilot-actuated spool valve that uses a threaded bolt disposed through a hub of the spool and threaded into internal threads on a distal end of a piston's stem. A pin extends through both the bolt and the stem, and the ends of the pin are flared to prevent disconnection.

Figure 1:
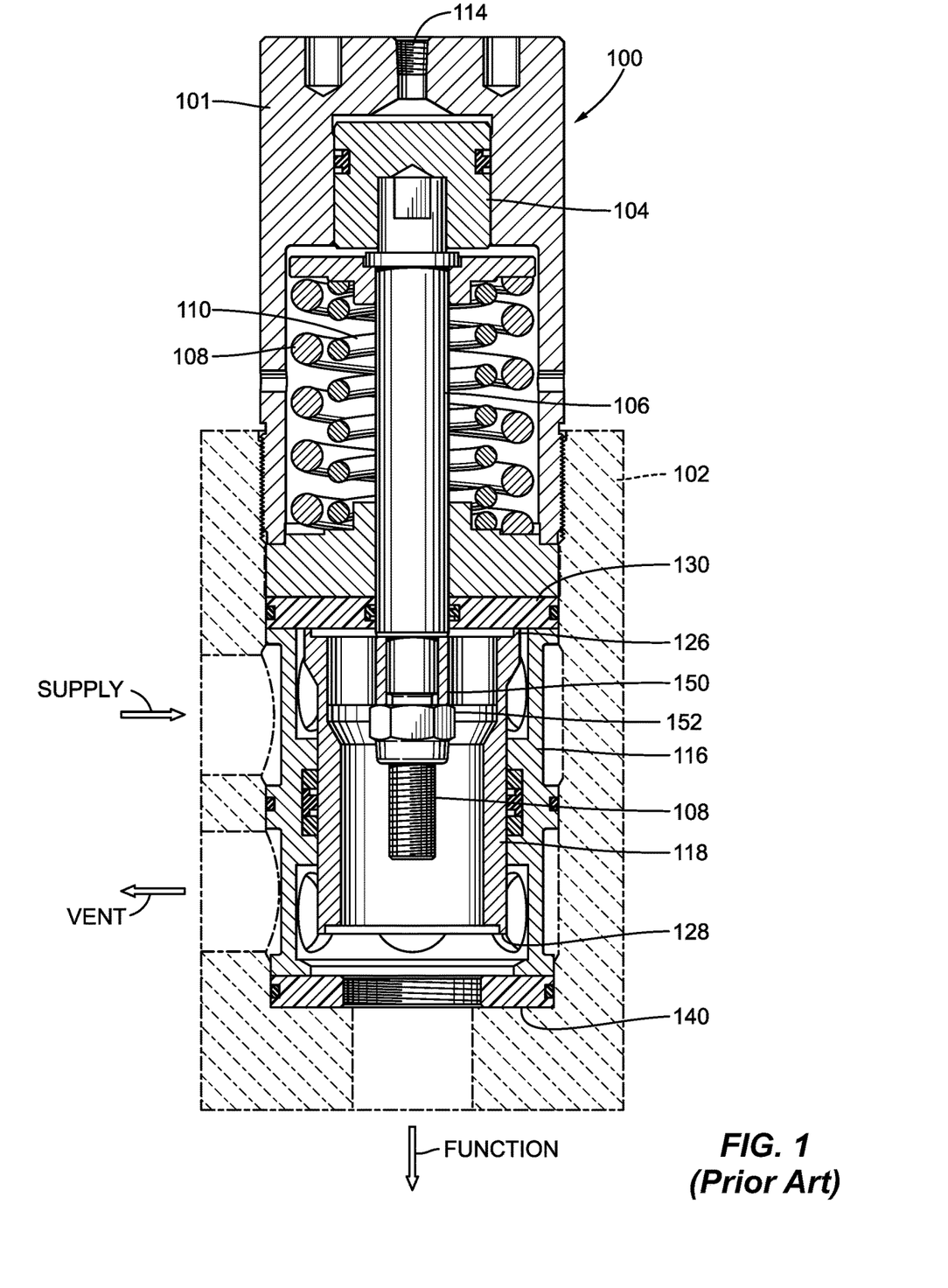
FIG. 1 is a cross-sectional view of a sub-plate mounted, normally-closed spool valve of the prior art.

In yet another example, FIG. 1 depicts a reciprocating sleeve (or "spool") type valve 100 of the prior art, similar to that disclosed in US 2013/0319557. The valve 100 is actuated by a piston 104 that is responsive to a hydraulic pressure supplied via a pilot pressure port 114. The piston 104 moves a stem 106 against the bias of springs 110, 108 so a spool 118 sealed in a cage 116 can be moved between open and closed positions relative to upper and lower seals 130, 140.

In the closed position shown in FIG. 1, an upper edge 126 of the spool 118 seals against the upper seal 130, and fluid communication is provided between the function port and the vent port. In the open position, however, the lower end 128 of the spool 118 seals against the lower seal 130, and fluid communication is provided between the supply port and the function port through the spool 118.

To connect the spool 118 to the stem 106 of the piston 104, a nut 152 is threaded onto a distal end 108 of the stem 106 and abuts against a central hub 150 of the spool 118. In practice, it has been found that the nut 152 securing the valve stem 106 to the spool 118 tends to loosen when the valve 100 is subjected to repeated use.

The subject matter of the present disclosure is directed to overcoming, or at least reducing the effects of, one or more of the problems set forth above.

SUMMARY OF THE DISCLOSURE

A pilot-actuated spool valve according to the present disclosure comprises a generally cylindrical valve cage having a central axial cavity open at both ends and a plurality of generally radial openings connecting the central axial cavity to the external cylindrical surface of the cage; a valve sleeve sized to slide within the central axial cavity of the cage and having a first sealing surface at a first end and a second sealing surface at an opposing second end; a piston responsive to fluid pressure at a pilot inlet of the valve; a piston rod connected at a first end to the piston and having a threaded second end opposite the first end; and a cap nut in threaded engagement with the second end of the piston rod securing the valve sleeve to the piston rod. The cap nut is sized and configured to provide a clearance gap between the cap nut and the valve sleeve when the cap nut is fully tightened onto the threaded second end of the piston rod. The clearance gap provides some degree of self-alignment between the valve sleeve and the valve cage, preventing binding. Moreover, the cap nut may be tightened securely to the piston rod making it less likely to loosen over time.

The foregoing summary is not intended to summarize each potential embodiment or every aspect of the present disclosure.

DETAILED DESCRIPTION

The subject matter of the present disclosure may best be understood by reference to the exemplary embodiment(s) illustrated in the drawing figures and described below.

Figure 2:
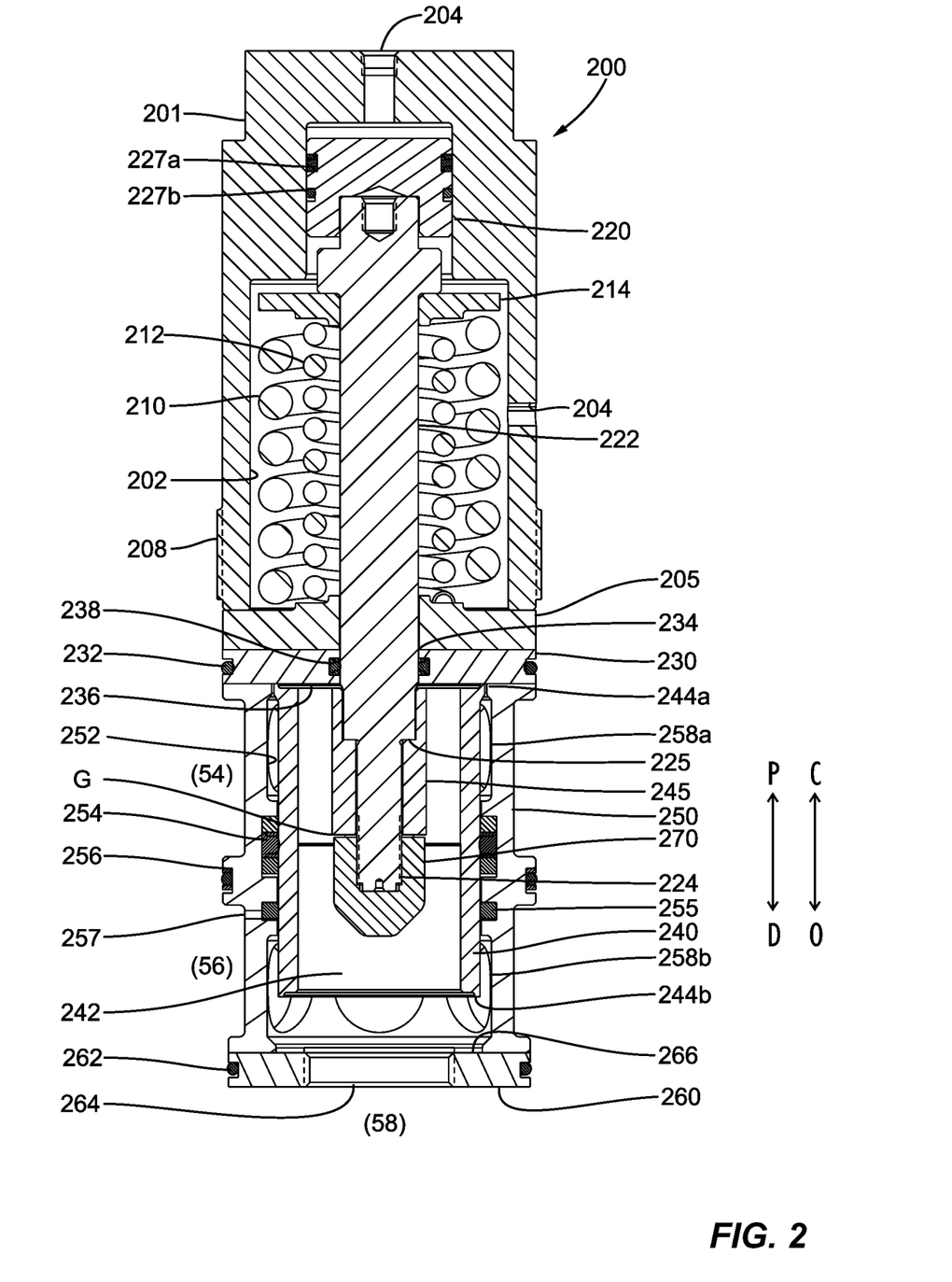
FIG. 2 is a cross-sectional view of a pilot-actuated spool valve according to the present disclosure.
Figure 3:
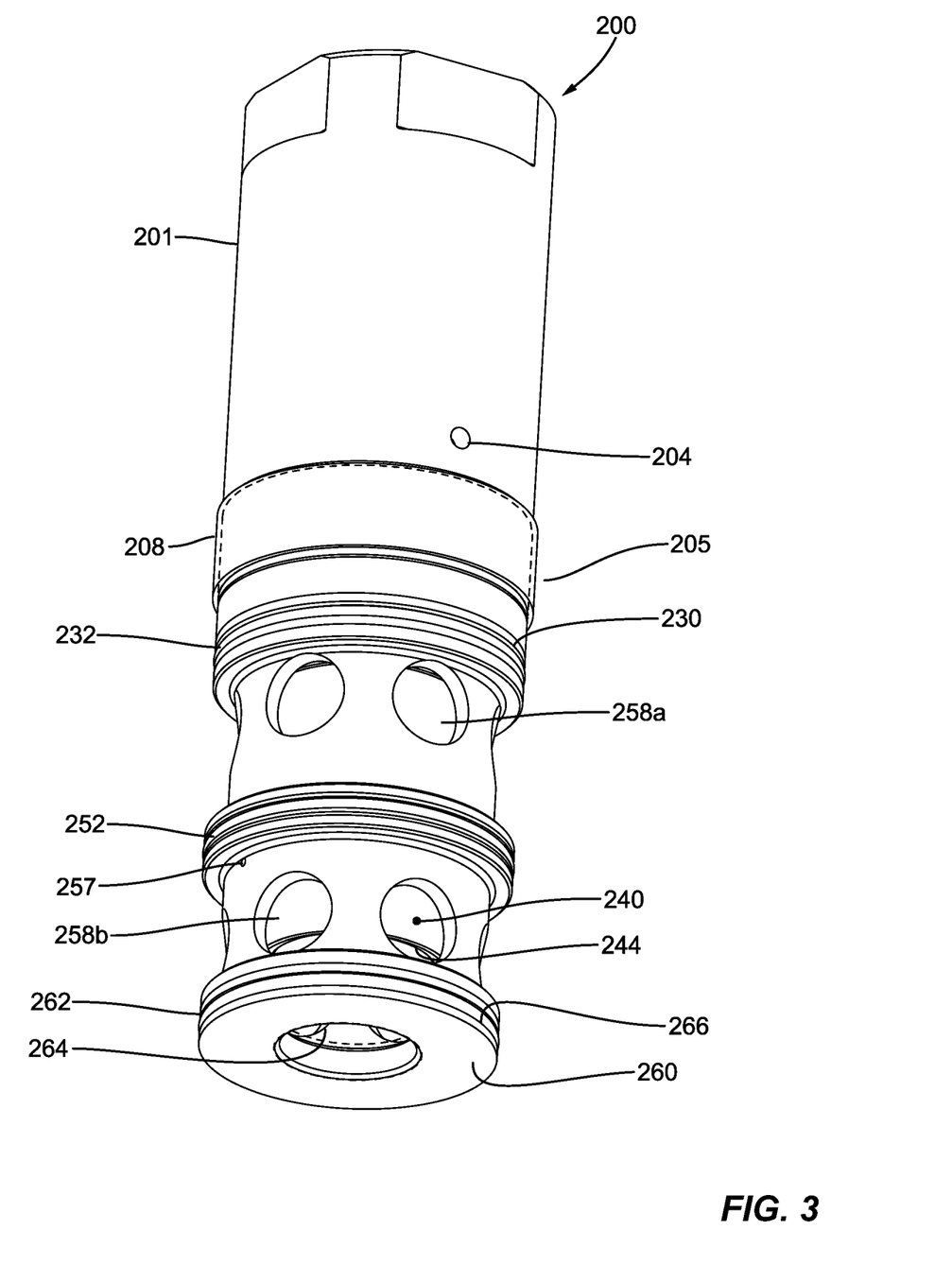
FIG. 3 is a perspective view of the spool valve.
Figure 4:
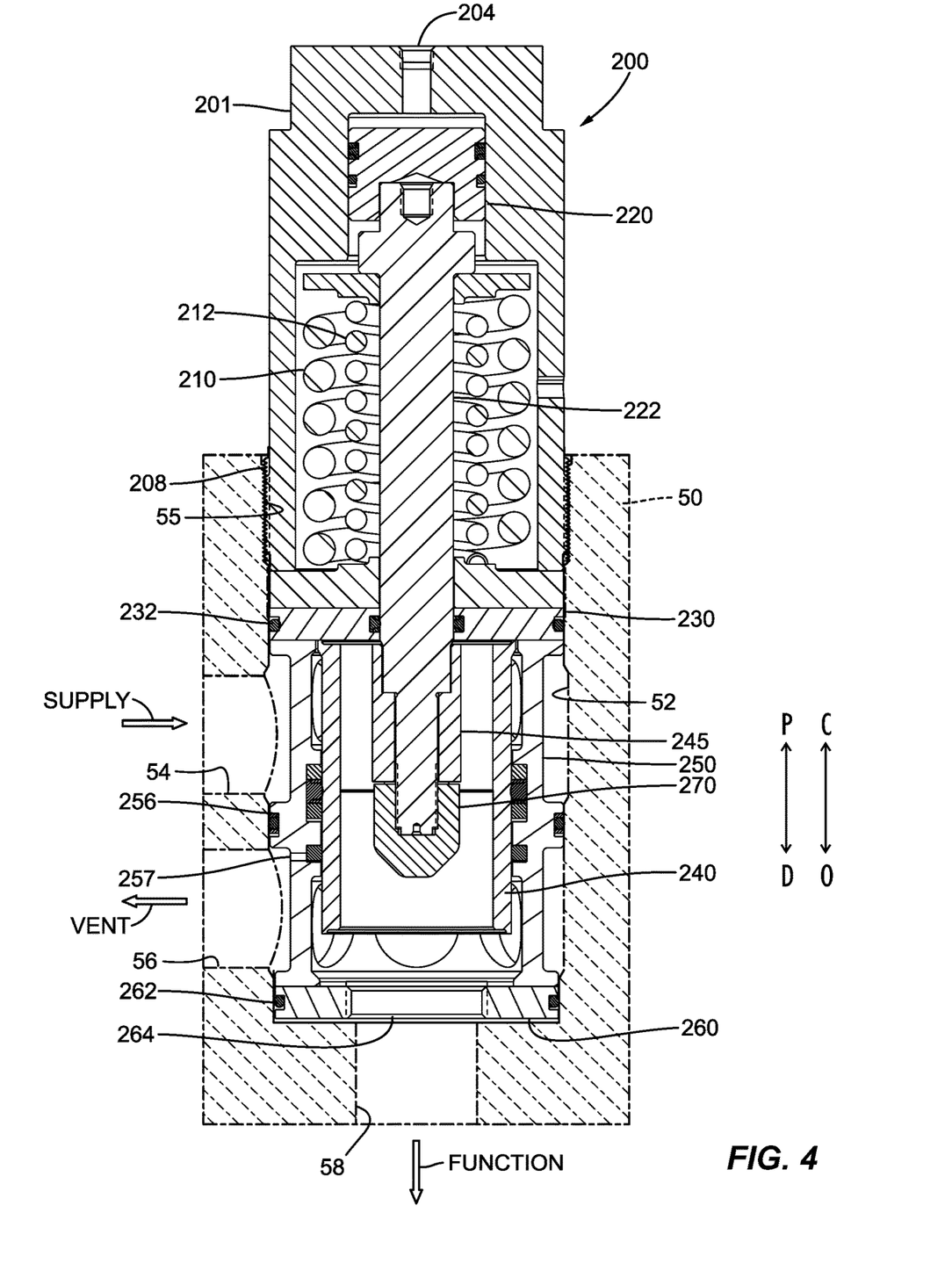
FIG. 4 is a cross-sectional view of the valve as a sub-plate mounted, normally-closed spool valve installed in a receptacle of a component.

Turning to FIGS. 2-4, a spool valve 200 is actuated by fluid pressure via a pilot source. As shown in FIG. 4, the spool valve 200 can be used in a component 50 defining a receptacle 52. In one configuration, for example, the valve 200 can be a subplate-mounted ("SPM") valve, in which case the component 50 may be a sub-plate. The receptacle 52 has an opening with internal thread 55. Inside, the receptacle 52 has an end surface and a sidewall. The sidewall has a supply port 54 and a vent port 56, and the end surface has a function port 58.

As shown in FIGS. 2 and 4, the valve 200 includes a distal (lower) seal 260, an outer body or cage 250, a proximal (upper) seal 230, an inner sleeve or spool 240, a piston housing 201, and a piston 220. The valve 200 is actuated by the piston 220, which is responsive to a hydraulic pressure supplied via a pilot pressure port 204. At least one biasing element is used inside the piston housing 201 to bias against the pilot pressure. In particular, an outer spring 210 and a concentric inner spring 212 act against an end plate 214 and bias the piston 220 to the position shown in FIGS. 2 and 4 when the pilot hydraulic pressure decreases to a certain level. In that sense, the valve 200 is a normally-closed valve—i.e., in the absence of hydraulic pressure at the port 204, the valve 200, acting under the influence of the springs 210 and 212, closes the supply port (54) from communicating with the function port (58) and opens the function port (58) to the vent port (54).

Looking at the components of the valve 200 in detail, the cage 250, the proximal seal 230, and the distal seal 260 form an outer body of the valve 200, while the inner sleeve or spool 240 forms an inner body of the valve 200. The distal seal 260 as shown in FIG. 4 is disposed in the receptacle 52 adjacent the end surface and defines a first orifice 264 communicating with the function port 58. The cage 250 is disposed in the receptacle 52 with the cage's distal end set against the distal seal 260, and the proximal seal 230 is disposed in the receptacle 52 on the proximal end of the cage 250. The proximal seal 230 defines a second orifice 234, as shown in FIG. 2. The piston housing 221 is threaded into the internal threads 55 of the receptacle 52 against the proximal seal 230 to hold the assembly in place.

As best shown in FIG. 2, the cage 250 has an inner passage or central bore 252 and has proximal and distal open ends set against the proximal and distal seals 230, 260 respectively. The central bore 252 communicates with the function port (58) through the first orifice 264 of the distal seal 260. In its cylindrical sidewall, the cage 250 has at least one distal side opening 258b toward the distal end 244b and has at least one proximal side opening 258a toward the proximal end 244a.

As best shown in the perspective view of FIG. 3, a number of the distal and proximal side openings 258a-b are defined around the cage 250. When the valve 200 is installed in the receptacle 52 as shown in FIG. 4, the distal side openings 258b communicate the cage's central bore 252 with the vent port 56 outside the cage 250, and the proximal side openings 258a communicate the cage's central bore 252 with the supply port 54 outside the cage 250.

Externally, the cage 250 has an external seal 256 that engages the sidewall of the receptacle 52 and seals the supply and vent ports 54, 56 from one another. Internally and as best shown in FIG. 2, the cage 250 has an intermediate annular seal 254 disposed in the central bore 252 between the distal and proximal openings 258a-b.

Positioned internal to the cage 250, the spool 240 is slideably sealed with the intermediate seal 254 and is movably disposed within the cage's central bore 252 in first and second opposite directions between the inner and proximal seals 230. The first direction can be a proximal direction (P), a closed direction (C), or an outward direction in which the proximal end 244a of the spool 240 engages or seals against the proximal seal 230. The second direction can be a distal direction (D), an opened direction (O), or an inward direction in which the distal end 244b of the spool 240 engages or seals against the distal seal 260.

For its part, the housing 201 internally has the piston 220 disposed therein that is movably responsive to the fluid pressure at the pilot inlet 204 from the pilot source (not shown). The piston 220 can seal in the housing 201 using a T-seal 227a and an O-ring seal 227b.

The piston 220 has a stem or rod 222, which is biased by the springs 210, 212 between a bearing plate 214 and a housing base 205. The chamber 202 of the housing 201 may have a port 204 exposed to a reference pressure, which is typically the environmental pressure found subsea. The stem 222 extends through the second orifice 234 of the proximal seal 230 and has a distal end 224 connected to the spool 240 using a cap nut 270, as discussed in more detail below.

Looking at the seals of the valve 200, the intermediate seal 254 comprises a T-seal ring disposed in an annular groove about the cage's central bore 252. Wear rings are disposed in the annular groove on both sides of the T-seal ring 254.

An additional wear ring 255 can be disposed in another annular groove about the cage's central bore 252 between the intermediate seal 254 and the distal side openings 258b. The additional wear ring 255 engages the spool 240, and a side port 257 in the cage 250 communicates the annular groove outside the wear ring 255 with the vent port (56) outside the cage 250.

The proximal seal 230 provides a proximal sealing surface 236 for the spool 240 when moved outward in the first direction (P, C) in the receptacle 52. The proximal seal 230 is a disc having the central opening 234 through which the piston's stem 222 passes. An external seal 232 is disposed about the disc 230 for sealing against the sidewall of the receptacle 52. An internal seal 238 is disposed about the central opening 234 for sealing with the piston's stem 222.

The distal seal 260 provides a distal sealing surface 266 for the spool 240 when moved inward in the second direction (D, O) in the receptacle 52. The distal seal 260 is a disc having a central opening 264 communicating the central bores 242, 252 with the function port 58. Although not shown, the central axial opening 264 of the distal seal 260 can be internally threaded for engagement with an insertion/removal tool (not shown). An external seal 262 is disposed about the disc 260 for sealing against the sidewall of the receptacle 52.

The cage 250 can have a circumferential ridge disposed externally about the cage 250 between the inner and outer side openings 258a. An external seal 256 is disposed in the ridge for sealing against the sidewall of the receptacle 52 between the supply and vent port 54, 56.

With an understanding of the valve 200 and its components, discussion now turns to how the piston 220 attaches to the spool 240 so that movement of the piston 220 is transferred to movement of the spool 240. The spool 240 has a hub 245 disposed in the central bore 242. The hub 245 is a cylindrical member having a central passage for insertion of the distal end 224 of the piston's rod 222. Although not shown, the hub 245 can be connected inside the central bore 242 of the spool 240 using one or more radial ribs.

Figure 5:
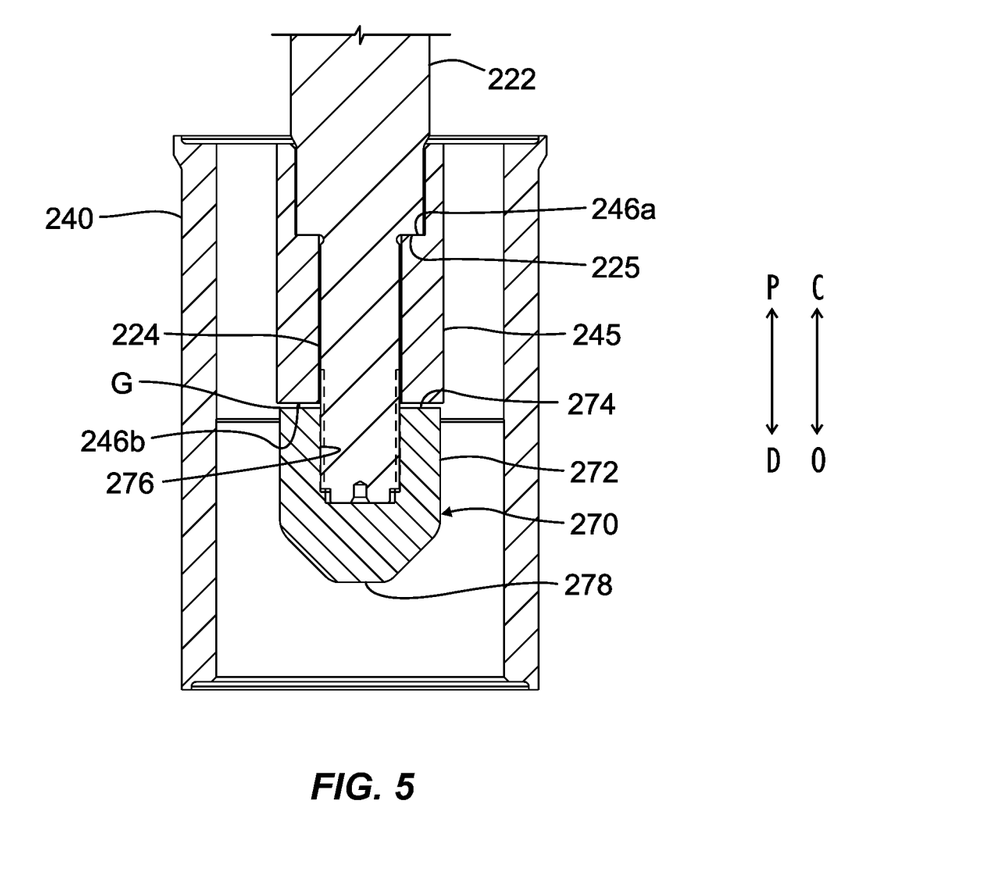
FIG. 5 is a detail of the piston rod connected to the spool with the cap nut.

As noted above, the cap nut 270 is in threaded engagement with the distal end 224 of the piston's stem 222 to secure the spool 240 to the stem 222. As shown in the detail of FIG. 5, the cap nut 270 has a cylindrical sidewall 272 and a cap end 278. The cylindrical sidewall 272 has internal thread about a blind bore 276. The cap end 278 closes the blind bore 276 of the cap nut 270.

The cap nut 270 fully tightened onto the threaded distal end 224 has the cap end 278 tightened into engagement with the distal end 224. An edge of the cylindrical sidewall 272 has a first shoulder 274 facing the first direction (P, C) toward a second shoulder 246b of the spool's hub 245, which faces the second direction (D, O). Depending on the position/movement of the spool 240, the cap nut's shoulder 274 defines a clearance gap G or can engage with the second shoulder 246b of the sleeve's hub 245.

The distal end 224 of the piston's stem 222 also includes a third shoulder 225 facing the second direction (D, O). Internally, the sleeve's hub 245 has a fourth shoulder 246a facing the first direction (P, C). In like manner, the third and fourth shoulders 225, 246a are configured to engage one another or to have the clearance gap G depending on the position/movement of the spool 240.

In operation of the valve 200 as shown in FIGS. 2 & 4, the spool 240 is reciprocated within the inner bore 252 of the cage 250 in response to the action of the piston's stem 222, which is connected to the piston 220 and has its distal end 224 extending through the hub 245 of the spool 240. The end cap 270 threaded onto the distal end 224 holds the spool 240 on the stem 222.

When the valve 200 is in the closed condition, the spool 240 is moved in the proximal or closed direction (P, C), and the spool's proximal annular edge 244a bears against the proximal sealing surface 236 of the proximal seal 230. The function port (58) is in fluid communication with the vent port (56) via the distal side openings 258b in the cage 250. In this closed condition, fluid communication of the supply port (54) with the central passageway 242 via the proximal side openings 258a in the cage 250 (and hence the function port (58)) is blocked by the sealing engagement of the spool's annular edge 244a with the proximal seal 230. The T-seal 254 and wipers/back-up seals provide a seal between the inner bore 252 of the cage 250 and the outer, cylindrical surface of the spool 240. Meanwhile, the outer surface of the cage 250 has the external seal 256 for sealing to the wall of the receptacle 52 between the ports 54, 56.

When valve 200 is in the opened condition, the spool 240 is moved in the distal or opened direction (e.g., downward as oriented in FIGS. 2 and 4) until the distal annular edge 244b bears against the distal sealing surface 266 of the distal seal 260. This action closes the fluid communication between the vent port (56) and the function port (58). Because the proximal edge 244a has consequently moved away from the proximal sealing surface 236 of the proximal seal 230, fluid may flow from the supply port (54) via the proximal side openings 258a into the central passage 242 of the spool 240, through the central opening 264 in the distal seal 260, and out the function port (58). With the valve 200 in the closed condition, the shoulder 225 of the stem 222 as shown in FIG. 5 can engage the shoulder 246a of the hub 245.

However, the cap nut 270 is sized and configured such that, when it is threaded onto the distal end 224 of the piston stem 222 opposite the piston 220, the end 224 of piston stem 222 bottoms out in the internally threaded blind bore 276 of the cap nut 270. This leaves the clearance G between the cap nut's shoulder 274 and the spool's shoulder 246b, especially when the valve 200 is closed. In one particular preferred embodiment, the clearance G is about 0.020 inch. In general, the clearance G may range from about 0.010 inch to about 0.040 inch.

It has been found that clearance G permits a degree of self-alignment of the spool 240 in the cage 250, thereby avoiding binding between those two elements when the spool 240 slides longitudinally with respect to the cage 250. The cap nut 270 may be tightened to the piston stem 222 using high torque making it less likely to loosen over time.

When the valve 200 is in the opened condition as shown in FIGS. 2 & 4, the hub's shoulder 246b may tend to move closer to the cap nut's shoulder 274, decreasing the clearance gap G between them. However, the bias of the springs 210, 212 and the hydrostatic pressure in the chamber 222 balanced against the pilot port pressure on the piston 220 may be set or controlled to mitigate or ease shouldering of the nut 270 to the hub 245 when the valve 200 is opened.

As will be appreciated, any reference to direction, such as inner, outer, lower, upper, distal, proximal, inward, outward, up, down, and the like are merely used for convenience and do not limit the operation and orientation of the disclosed valve 200.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A spool valve actuated by pilot pressure for controlling communication of a third port with a first port and a second port, the valve comprising:
   an outer body having a first inner passage, the outer body having at least one first, second, and third opening communicating the first inner passage respectively with the first, second, and third ports outside the outer body;
   an annular seal disposed in the first inner passage between the at least one first and second openings;
   an inner body disposed within the first inner passage of the outer body, the inner body being movable in first and second opposite directions between first and second positions and being slideably sealed with the annular seal, the inner body in the first position communicating the at least one third opening with the at least one second opening, the inner body in the second position communicating the at least one third opening with the at least one first opening, the inner body having a fourth shoulder facing the first direction and having a second shoulder facing the second direction;
   a piston movably responsive to the pilot pressure and having a distal end on which the inner body is movably disposed, the distal end having a third shoulder facing the second direction; and
   a cap nut threaded onto the distal end, the cap nut having a cap end abutting the distal end and having a first shoulder facing the first direction,
   the first shoulder being engageable with the second shoulder of the inner body and the third shoulder defining a first clearance gap with the fourth shoulder of the inner body when the inner body is positioned in the first position,
   the first shoulder defining a second clearance gap with the second shoulder of the inner body and the third shoulder being engaged with the fourth shoulder of the inner body when the inner body is positioned in the second position.

2. The valve of claim 1, wherein a first end of first inner passage has a first sealing surface; wherein a second end of the first inner passage has a second inner surface with the at least one third opening communicating the first inner passage with the third port outside the outer body; and wherein the inner body has a second inner passage with first and second end openings, the inner body in the first position engaging the first end opening against the first sealing surface, the inner body in the second position engaging the second end opening against the second sealing surface and communicating the at least one third opening with the at least one first opening through the second inner passage.

3. The valve of claim 2, wherein the inner body comprises a hub disposed in the second inner passage, the hub having a central passage and having the second and fourth shoulders, the distal end of the piston disposed through the central passage of the hub.

4. The valve of claim 1, wherein the cap nut has a cylindrical sidewall and a cap end, the cylindrical sidewall having internal thread about a blind bore, the cap end closing the blind bore of the cap nut, the cap end tightening to engagement with the distal end of the piston, an edge of the cylindrical sidewall having the first shoulder.

5. The valve of claim 1, wherein the annular seal comprises:
   a T-seal ring disposed in an annular groove about the first inner passage; and
   wear rings disposed in the annular groove on both sides of the T-seal ring.

6. The valve of claim 1, further comprising a wear ring disposed in an annular groove about the inner passage between the annular seal and the at least one second opening, the wear ring engaging the inner body, a side port in the outer body communicating the annular groove with the second port outside the outer body.

7. The valve of claim 1, wherein the first sealing surface comprises a disc having a second orifice through which the piston passes, an internal seal disposed about the second orifice for sealing with the piston.

8. The valve of claim 1, wherein the piston comprises at least one biasing element biasing the piston against the pilot pressure.

9. The valve of claim 1, wherein the first and second clearance gaps are configured to provide a degree of self-alignment between the inner body and the outer body.

10. The valve of claim 1, wherein the inner body with the second and fourth shoulders is movable on the distal end of the piston between the first and third shoulders.

11. The valve of claim 1, wherein the cap nut is tightened fully to the distal end.

12. A spool valve actuated by pilot pressure for controlling communication of a function with a supply and a vent, the valve comprising:
   a cage having a central bore and first and second ends, the cage having at least one first side opening communicating the central bore with the supply outside the cage, the cage having at least one second side opening communicating the central bore with the vent outside the cage, the first end of the cage having a first sealing surface, the second end of the cage having a second sealing surface with an orifice communicating the central bore with the function;
   an annular seal disposed in the central bore between the at least one first and second side openings;
   a sleeve movably disposed within the central bore of the cage in first and second opposite directions between the first and second sealing surfaces, the sleeve having first and second end openings at opposing ends and having an outer surface slideably sealed with the annular seal, the sleeve having a fourth shoulder facing the first direction and having a second shoulder facing the second direction;
   a piston movably responsive to the pilot pressure and having a distal end on which the sleeve is movably disposed, the distal end having a third shoulder facing the second direction; and
   a cap nut in threaded engagement with the distal end of the piston and securing the sleeve thereto, the cap nut having a cap end capped against the distal end of the stem and having a first shoulder facing the first direction,
   the first shoulder being engageable with the second shoulder of the inner body and the third shoulder defining a first clearance gap with the fourth shoulder of the inner body when the inner body is positioned in the first position,
   the first shoulder defining a second clearance gap with the second shoulder of the sleeve and the third shoulder being engaged with the fourth shoulder of the inner body when the inner body is positioned in the second position.

13. The valve of claim 12, wherein the cap nut has a cylindrical sidewall and a cap end, the cylindrical sidewall having internal thread about a blind bore, the cap end closing the blind bore of the cap nut, the cap end tightening to engagement with the distal end of the piston, an edge of the cylindrical sidewall having the first shoulder.

14. The valve of claim 12, wherein the intermediate seal comprises:
   a T-seal ring disposed in an annular groove about the central bore; and
   wear rings disposed in the annular groove on both sides of the T-seal ring.

15. The valve of claim 12, further comprising a wear ring disposed in an annular groove about the central bore between the intermediate seal and the at least one second side opening, the wear ring engaging the sleeve, a side port in the cage communicating the annular groove with the vent outside the cage.

16. The valve of claim 12, wherein the first sealing surface comprises a disc having a central opening through which the piston passes, the disc having an external seal disposed about the disc for sealing against the receptacle, the disc having an internal seal disposed about the central opening for sealing with the piston.

17. The valve of claim 12, wherein the second sealing surface comprises a disc having a central opening communicating the central bore with the function, the disc having an external seal disposed about the disc for sealing against the receptacle.

18. The valve of claim 12, wherein the cage comprises a ridge disposed externally about the cage between the at least one first and second side openings; and an external seal disposed in the ridge for sealing against the receptacle.

19. The valve of claim 12, wherein the sleeve comprises a hub disposed in the central bore, the hub having a central passage and having the second and fourth shoulders, the distal end of the piston disposed through the central passage of the hub.

20. The valve of claim 12, wherein the piston comprises at least one biasing element biasing the piston against the pilot pressure.

21. A spool valve actuated by pilot pressure for use in a component defining a receptacle, the receptacle having an opening, an end surface, and a sidewall, the sidewall having a supply port and a vent port, the end surface having a function port, the valve comprising:
   a distal seal disposed in the receptacle adjacent the end surface and defining a first orifice communicating with the function port;
   a cage having a central bore with distal and proximal open ends, the cage disposed in the receptacle with the distal open end adjacent the distal seal, the cage having at least one distal side opening toward the distal end and having at least one proximal side opening toward the proximal end, the at least one distal side opening communicating the central bore with the vent port outside the cage, the at least one proximal side opening communicating the central bore with the supply port outside the cage;

an intermediate seal disposed in the central bore between the at least one distal and proximal side openings;

a proximal seal disposed in the receptacle adjacent the proximal open end of the cage and defining a second orifice;

a sleeve slideably sealed with the intermediate seal and being movably disposed within the central bore of the cage in distal and proximal directions between the distal and proximal seals;

a housing threaded into the opening of the receptacle adjacent the proximal seal;

a piston disposed in the housing and movably responsive to the pilot pressure, the piston having a distal end disposed through the second orifice, the distal end having the sleeve movably disposed thereon, the distal end having a distal-facing shoulder facing the distal direction; and a cap nut in threaded engagement with the distal end of the piston and securing the sleeve thereto, the cap nut fully tightened onto the threaded distal end having a proximal-facing shoulder facing the proximal direction, the sleeve defining a clearance gap between the distal and proximal-facing shoulders, the clearance gap configured to provide a degree of self-alignment between sleeve and the cage.

22. The valve of claim 21, wherein the piston comprises at least one biasing element disposed in the housing and biasing the piston against the pilot pressure.

* * * * *

UNITED STATES PATENT AND TRADEMARK OFFICE
CERTIFICATE OF CORRECTION

PATENT NO. : 11,085,545 B2
APPLICATION NO. : 16/561736
DATED : August 10, 2021
INVENTOR(S) : Max Stetzer et al.

It is certified that error appears in the above-identified patent and that said Letters Patent is hereby corrected as shown below:

In the Claims

Column 6, Line 54 in Claim 2, the word -- the -- should be inserted between "of" and "first.".

Column 6, Line 56 in Claim 2, the word "inner" between "second" and "surface" should be replaced with -- sealing --.

Column 7, Line 17 in Claim 6, the word -- first -- should be inserted between "the" and "inner.".

Column 7, Line 22 in Claim 7, the word "the" after "wherein" should be replaced with -- a --.

Column 7, Line 66 in Claim 12, the word "stem" should be replaced with -- piston --.

Column 8, Lines 2 to 9 in Claim 12, the words "inner body" should be replaced with -- sleeve --.

Column 8, Line 4 in Claim 12, the word "the" before "first" should be replace with -- a --.

Column 8, Line 9 in Claim 12, the word "the" before "second" should be replace with -- a --.

Column 8, Line 18 in Claim 14, the word "intermediate" before "seal" should be replaced with -- annular --.

Column 8, Line 26 in Claim 15, the word "intermediate" before "seal" should be replaced with -- annular --.

Column 8, Line 33 in Claim 16, the word "the" before "receptacle" should be replaced with -- a --.

Column 8, Line 40 in Claim 17, the word "the" before "receptacle" should be replaced with -- a --.

Signed and Sealed this
Twentieth Day of June, 2023

Katherine Kelly Vidal
*Director of the United States Patent and Trademark Office*

CERTIFICATE OF CORRECTION (continued)
U.S. Pat. No. 11,085,545 B2

Column 8, Line 44 in Claim 18, the word "the" before "receptacle" should be replaced with -- a --.

Column 9, Line 28 in Claim 21, the word -- the -- should be inserted between the words "between" and "sleeve.".